United States Patent [19]

Gawne

[11] 4,280,791
[45] * Jul. 28, 1981

[54] BI-DIRECTIONAL PUMP-TURBINE

[76] Inventor: Gordon S. Gawne, 840 Roeser St., Freeland, Mich. 48623

[ * ] Notice: The portion of the term of this patent subsequent to Aug. 19, 1997, has been disclaimed.

[21] Appl. No.: 971,189

[22] Filed: Dec. 20, 1978

Related U.S. Application Data

[63] Continuation-in-part of Ser. No. 906,486, May 17, 1978, Pat. No. 4,218,176.

[51] Int. Cl.³ .............................................. F01D 1/36
[52] U.S. Cl. ..................................... 415/90; 415/154; 415/202
[58] Field of Search ..................... 415/90, 152 R, 154, 415/89, 202

[56] References Cited

U.S. PATENT DOCUMENTS

| | | | |
|---|---|---|---|
| 1,383,937 | 7/1921 | Guthrie | 415/76 |
| 1,402,053 | 1/1922 | Dake | 415/90 |
| 4,025,225 | 5/1977 | Durant | 415/90 |
| 4,218,176 | 8/1980 | Gawne | 415/90 |

*Primary Examiner*—Louis J. Casaregola
*Attorney, Agent, or Firm*—Cullen, Sloman, Cantor, Grauer, Scott & Rutherford

[57] ABSTRACT

An improved fluid propulsion apparatus of the type which includes a housing, a plurality of spaced apart discs rotatably mounted on a shaft and positioned within the housing, and a plurality of fluid inlet and outlet ports all in communication with the interior of the housing. The housing includes a circumferential peripheral zone defined as the region between the interior of the housing and the periphery of the discs. The apparatus may be utilized as a pump or as a turbine. During operation as a pump, the shaft and discs are rotated and fluid is introduced into the housing at a port at the center of the housing, flows in an outwardly spiralling path between the discs within the housing, and flows into the peripheral zone from where it is removed through one of several ports at the periphery of the housing. The ports at the periphery of the housing are positioned such that the apparatus may be utilized as a pump with the discs and shaft rotated in either a clockwise or a counter-clockwise direction. When the apparatus is utilized as a turbine, fluid is injected into the peripheral zone through a port at the periphery of the housing and flows in an inwardly spiralling path thus causing rotation of the discs and shaft, and the fluid then exits the housing from a port adjacent the shaft. Again, the positional relationship of the ports at the periphery of the housing permits the injection of the fluid to rotate the discs and shaft in either the clockwise or counter-clockwise direction.

The ports at the periphery of the housing may be pitot-like flow paths bored in a pitot block which is removably secured to the housing to provide versatility of fluid flow characteristics.

12 Claims, 6 Drawing Figures

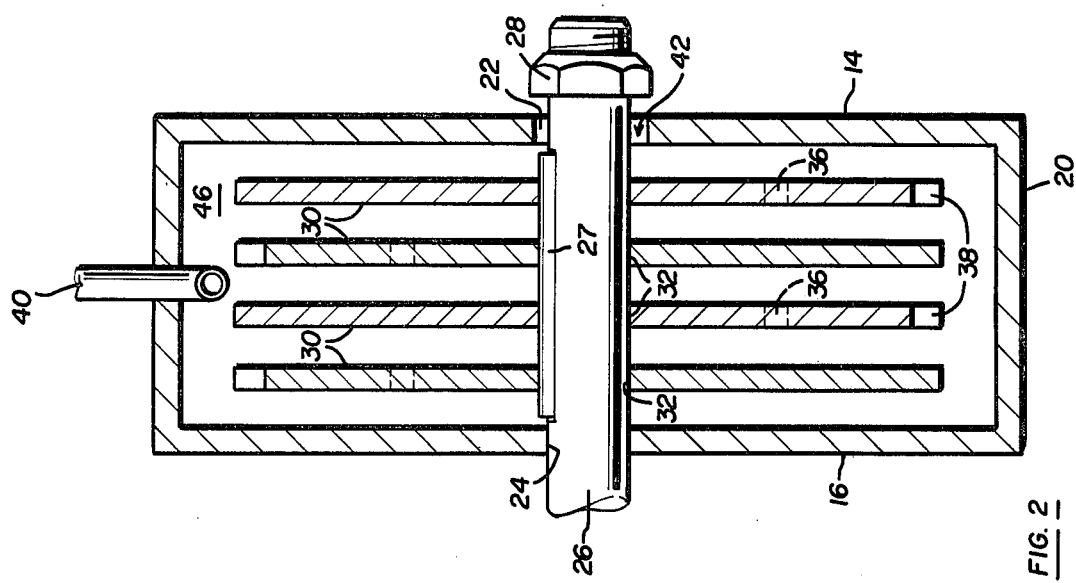
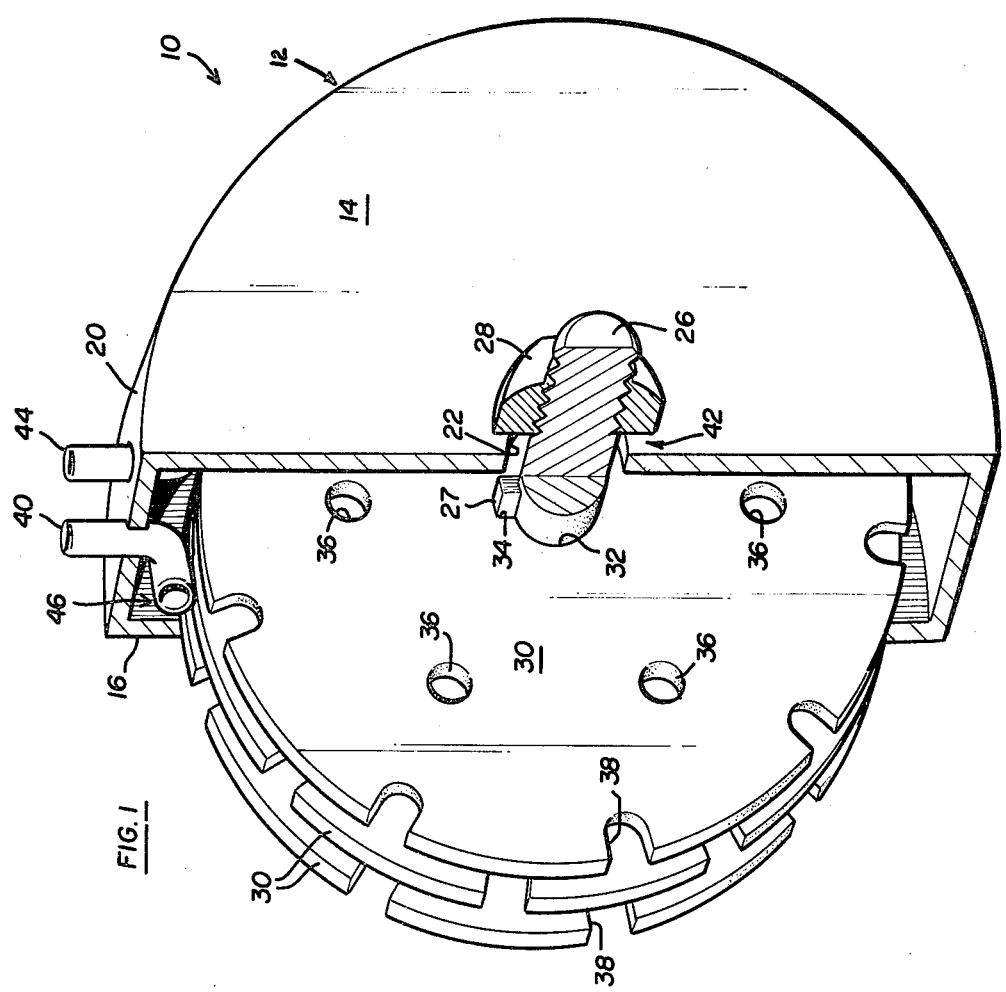

BI-DIRECTIONAL PUMP-TURBINE

CROSS REFERENCE TO RELATED APPLICATIONS

This application is a continuation-in-part of my application Ser. No. 906,486, filed May 17, 1978 (U.S. Pat. No. 4,218,176), and entitled Fluid Propulsion Apparatus.

Furthermore, the invention disclosed herein may contain subject matter common to my prior application for "Efficient Bladeless-Wheel Apparatus", filed Nov. 7, 1975, Ser. No. 629,894, and now abandoned. Each of the above applications are hereby incorporated by reference.

BACKGROUND OF THE INVENTION

This invention relates generally to fluid propulsion apparatus and, more particularly, to a fluid propulsion apparatus which may be used as a pump or a turbine and wherein the internal parts are rotated in either a clockwise or a counter-clockwise direction.

The principle of a rotating disc, pump or turbine is, of course, old and well-known. The uses of such a device as a pump, to convert mechanical energy into fluid flow and thus pressure, or as a turbine to convert fluid flow into mechanical energy, are well-accepted in the art.

Throughout the years, there have been many improvements made with respect to fluid propulsion apparatus. However, none of the fluid propulsion apparatus of which I am aware has recognized the mechanical interface problems with respect to the environment in which the pump or turbine is to be used.

To understand this problem, consider first the situation where the fluid propulsion apparatus is being utilized as a turbine. Typically, the apparatus has a port at the periphery positioned in such a way that the discs will rotate in only one direction, either clockwise or counter-clockwise. Such rotation, of course, means that the discs and shaft will only rotate in one direction. If the shaft of the turbine rotates only in the clockwise direction, but if the apparatus to which the turbine is connected requires a counter-clockwise rotation, then it is necessary to provide an auxiliary mechanical gearing to convert the turbine output from clockwise rotation to counter-clockwise rotation.

A similar problem arises, of course, when the fluid propulsion apparatus is utilized as a pump and the shaft is mechanically rotated. Since the device which rotates the shaft is usually capable of rotation in either the clockwise or the counter-clockwise direction, if the pump itself is constructed so as to rotate in only one direction, then an auxiliary mechanical gearing element is again necessary.

Heretofore, the prior art developments in the pump and turbine art have not addressed themselves to the problem above described. Hence the present invention overcomes the problems of the prior art by providing a fluid propulsion apparatus which is operable as either a pump or a turbine and is operable in both the clockwise and the counter-clockwise directions.

SUMMARY OF THE INVENTION

The present invention solves the above problems by providing an improved fluid propulsion apparatus operable as a pump or as a turbine and operable in both the clockwise and counter-clockwise directions without additional mechanical interface devices.

More particularly, the present invention provides a fluid propulsion apparatus including a hollow housing, a shaft rotatably mounted in the housing and plurality of spaced apart discs mounted on the shaft for rotation therewith, with the area between the interior of the housing and the periphery of the discs defined as the circumferential peripheral zone. Three fluid port means are provided in communication with the interior of the housing, one located at the center of the housing and the others located at the periphery of the housing. The two fluid port means at the periphery of the housing are positioned to open in opposite tangential directions relative to the axis of the shaft.

When the apparatus is utilized as a pump, fluid enters the port at the center of the housing and exits from one of the ports at the periphery of the housing depending on the direction of rotation of the discs. When the apparatus is utilized as a turbine, the fluid stream is introduced through one of the two fluid port means at the periphery of the housing depending upon the desired direction of rotation of the discs and shaft.

Furthermore, according to the principles of the present invention, the two fluid flow paths at the periphery of the housing may be formed as part of a removable block secured to the housing. In this fashion, the block may be removed and a different block having a different flow path arrangement may be substituted in its place thus providing different pressure and flow characteristics for the apparatus. Thus the present invention includes the advantage of interchangeable periphery flow path arrangements.

BRIEF DESCRIPTION OF THE DRAWINGS

The above identified advantages, together with other objects and advantages which may be attained by the use of the present invention, will become more apparent upon reading the following detailed description of the invention taken in conjunction with the drawings.

In the drawings, wherein like reference numerals identify corresponding parts:

FIG. 1 is a partly cut-away perspective illustration of a bi-directional pump-turbine according to the principles of the present invention;

FIG. 2 is a sectional view of a bi-directional pump-turbine according to the principles of the present invention;

DETAILED DESCRIPTION OF THE INVENTION

Figure 3:
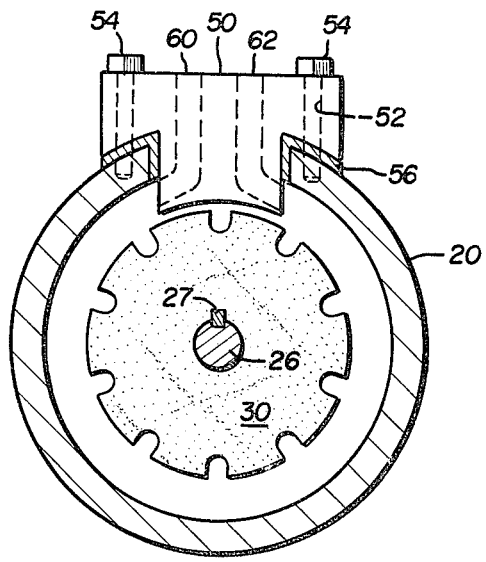
FIG. 3 is a side elevation view, partly in section, of the bi-directional pump-turbine apparatus of the present invention including a removable pitot block of the present invention.

FIG. 1 illustrates generally a bi-directional pump-turbine apparatus 10 according to the principles of the present invention. The apparatus 10 includes a generally disc-like hollow housing 12 having generally circular front and rear faces 14, 16, respectively, interconnected by a peripheral edge 20. Front face 14 has a central aperture 22 extending therethrough and rear face 16 has a central aperture 24 extending therethrough, and a shaft 26 extends through the hollow housing and through the apertures 22, 24 in the front and rear faces.

The shaft 26 is generally circular in cross-section and has an upwardly extending key 27 along its length. As illustrated generally in FIG. 2, the shaft is secured by a bolt 28 on one side of the housing.

The apparatus 10 of the present invention further includes a plurality of rotable discs 30 mounted on the shaft for rotation therewith and in FIG. 1, three such discs are illustrated. Each disc has a central aperture 32 therethrough and each aperture includes a keyway 34 to receive the key 27 of the shaft 26. Preferably the rotatable discs are relatively thin, closely spaced parallel members of essentially the same diameter and thickness.

As illustrated in FIG. 1, each of the discs 30 has a series of apertures 36 extending therethrough midway between the disc center and the disc peripheral edge. In addition, each of the discs has a series of peripheral grooves or notches 38 evenly spaced around the circumference or periphery of each disc.

The housing includes a first fluid port 40 extending through the periphery of the housing and in communication with the interior of the housing, a second fluid port 42 extending through the face of the housing generally at the center of the housing and in communication with the interior of the housing, and a third fluid port 44 adjacent the first port 40 and extending through the periphery of the housing. Each of the fluid ports permits fluid to be introduced into and removed from the apparatus 10. As may be expected with apparatus of the present type, the housing should be suitably sealed with respect to the fluid port means and with respect to the rotatable shaft to prevent leakage of fluid. By way of definition, the area between the interior of the housing 12 and the peripheral edges of the discs is defined as a circumferential peripheral zone.

If the apparatus 10 is to be utilized as a pump, means not shown are provided for rotating the shaft 26. The fluid in such an instance would be introduced at the second port 42 surrounding the shaft such as by an inducer, not shown, which of course is conventional. Consider the situation where the shaft 26 is rotated in a clockwise direction. Upon rotating the shaft in the clockwise direction, the fluid (which may be steam, water, or even a slurry) follows a clockwise spiral path of increasing radius outwardly from the center of the apparatus and into the peripheral zone 46 and then would exit through the first fluid port means 40.

If the apparatus is utilized as a pump and the shaft is rotated in the counter-clockwise direction, then the fluid follows a counter-clockwise spiral path of increasing radius outwardly from the center of the apparatus and into the peripheral zone 46 and then exits through the third fluid port means 44.

Conversely, if the apparatus is to be utilized as a turbine, then the fluid is introduced through either the first fluid port means 40 or the third fluid port means 44 to rotate the discs and thereby rotate the shaft 26. In such an instance the fluid would follow an inward spiral path of decreasing radius toward the center of the apparatus and exit through the second fluid port means 42. If the apparatus is utilized as a turbine and the fluid is introduced through the first fluid port means 40, then the apparatus will rotate the shaft in the counter-clockwise direction whereas if the fluid is introduced through the third fluid port means 44, the discs and shaft would be rotated in the clockwise direction.

In FIG. 1, the apparatus is illustrated as including three rotatable discs 30 while in FIG. 2 a second embodiment is illustrated including four rotatable discs. It may be appreciated that the size and number of discs are to be based upon the particular power requirements of the apparatus and thus the two embodiments of FIGS. 1 and 2, insofar as they relate to the number and thickness of the discs, are for illustrative purposes only. Similarly, the presence or absence of peripheral slots and central apertures in the discs are also based upon power requirements. The principles of operation of a fluid propulsion apparatus of this type, including the fluid boundary layer adherence and the like are, of course, well-known. Furthermore, the use of the central apertures in the discs to relieve or at least minimize pressure effects in the individual discs to avoid warping and buckling and non-parallel alignment problems caused by rapid disc rotation and by the passage of the fluid in its spiral path are, of course, also well known.

According to the principles of the present invention, the first and third fluid port means 40 and 44 are actually L-shaped hollow tubes which extend through the peripheral edge 20 of the housing 12 and open into the peripheral zone 46. The tubes, or fluid port means 40 and 44 open in opposite directions relative to the longitudinal axis of the shaft. Thus in the embodiment of FIGS. 1 and 2, each of the first and third fluid port means are actually pitot-like tubes. Each pitot-like tube is a fluid flow path. Furthermore, the cross-sectional area of the pitot-like tubes may be related to the peripheral zone as set forth in my co-pending application.

When the apparatus functions as a pump, the pitot-like tubes provide a collecting or scooping means for the fluid as it passes from the rotating tips of the discs into the peripheral zone 46. If the apparatus is being utilized as a turbine, then the pitot-like tubes are, of course, utilized as the inlet for the fluid.

With reference to FIGS. 3, 4, 5 and 6, another important feature of the present invention will now be explained. As may be appreciated, different applications of the present invention will require different pressure and flow characteristics and hence a different pitot-like tube arrangement. The apparatus of FIGS. 3, 4 and 5 permits the bi-directional pump-turbine of the present invention to be utilized to provide different pressure and flow characteristics. This is accomplished by providing a pitot block 50 which is removably secured to the housing 12. The pitot block 50 has a generally T-shaped cross-section and is generally rectangular in a plan view. The pitot block has a plurality of apertures 52 extending therethrough so that bolts 54 may be utilized to secure the pitot-block 50 to the housing 12. The housing, of course, must be suitably modified from the housing of FIGS. 1 and 2 by removing a portion of the edge or periphery 20 to accommodate the block 50. In addition, a gasket 56 should be provided between the pitot block and the housing to prevent leakage of fluid therebetween.

Figure 4:
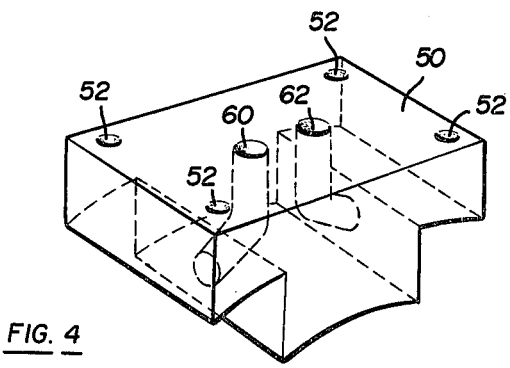
FIGS. 4 and 5 are perspective illustrations of removable forms of pitot blocks of the present invention.

The pitot block 50 of FIGS. 3 and 4 includes the first and third fluid flow paths which are machined or bored through the block. Thus fluid flow path 60 corresponds to the first fluid port means 40 of FIGS. 1 and 2 while fluid flow path 62 corresponds to the third fluid port means 44 of FIGS. 1 and 2.

Figure 5:
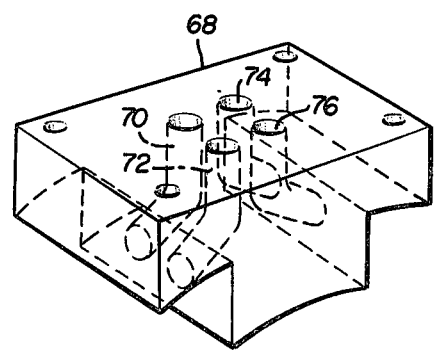

As may be appreciated, the pitot block 50 may include a plurality of fluid flow paths comprising the first fluid port means and a plurality of fluid flow paths comprising the third fluid port means. Thus FIG. 5 shows such a pitot block 68 having two such pitot-like flow paths 70, 72 machined therethrough for the first fluid port means and pitot-like flow paths 74 and 76 machined therethrough for the third fluid port means.

Figure 6:
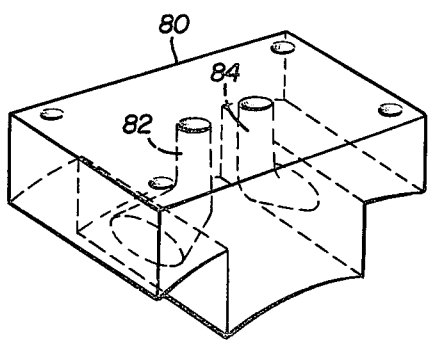
FIG. 6 is a side elevation view, partly in section, of yet another form of removable pitot block of the present invention.

FIG. 6 illustrates yet another embodiment of the present invention. In the embodiment of FIG. 6, the pitot block 80 has flow paths machined therethrough which are of flared or non-constant diameter. This is to be contrasted to the flow paths 60 and 62 of FIGS. 3 and 4, and the flow paths 70, 72, 74 and 76 of FIG. 5, each of which is essentially of a constant diameter except at the curve or bend of the flow path. Thus, for example the flow path 60 has the same diameter opening at the top of the pitot block 50 as it does where the flow path enters the peripheral zone.

In FIG. 6, the pitot block 80 has first and second flow paths 82, 84, bored therethrough corresponding to the first and third fluid port means. Flow path 82, for example, has a diameter $D_1$ at the top of the pitot block and a larger diameter $D_2$ at the peripheral zone. Since the flow path opening need not be circular, it is actually the cross-sectional area of the flow path opening at the peripheral zone which is larger than the cross-sectional area of the flow path at the top of the pitot block. Similarly, flow path 84 is of a non-constant diameter along its length.

The present invention, in each of its forms, provides certain additional benefits not heretofore known. In addition to the elimination of the mechanical interface, because of bi-directional rotation of the shaft, the present invention as three additional features.

First, if air is utilized as the fluid, the apparatus as a pump provides a low cost air compressor capable of compressing air up to at least 80 psi. Heretofore centrifugal types of compressors were required for such compression pressures.

Second, when used as a pump the apparatus will create a substantial vacuum from an air source or chamber connected to port 42. Thus the apparatus functions as a vacuum pump.

Third, again functioning as a pump, with Freon or the like refrigerant as the fluid, this apparatus is an inexpensive refrigeration-air conditioning compressor, compressing the liquid refrigerant and converting it into the gaseous state.

The foregoing is a complete description of the present invention. Many changes may be made without departing from the spirit and scope of the inventive concept. The invention, therefore, should be limited only by the scope of the following claims.

What is claimed is:

1. In a fluid propulsion apparatus including a generally circular hollow housing, a shaft rotatably mounted in said housing, a plurality of spaced-apart circular discs mounted on the shaft for rotation therewith interiorly of said housing, said discs being concentric relative to said housing, a circumferential peripheral zone defined as the region between the interior of the housing and the periphery of said discs, a first fluid port means and a second fluid port means each of said first and second fluid port means extending through said housing and in communication with the interior thereof so that a fluid stream entering one of said port means flows through said housing in a spiral path and exits from the other of said port means, the improvement of a bi-directional pump-turbine comprising:

a third fluid port means extending through said housing and in communication with the exterior thereof so that a fluid stream can enter and exit from said third fluid port means;

said first and third fluid port means in communication with said peripheral zone and opening in opposite directions therein relative to the axis of rotation of said shaft and said discs;

said first and third fluid port means each including an elongated pitot-like flow path having a first end and a second end, said first end lying in, and in communication with, said peripheral zone;

the cross-sectional area of the first end of each of said elongated flow paths being at least as large as the cross-sectional area of the second end of said flow path;

the first end of each of said elongated flow paths lying in a plane substantially normal to the flow path within said peripheral zone.

2. The invention as defined in claim 1 wherein said first fluid port means is the exit port for said fluid stream so that said apparatus functions as a pump when said shaft is rotated in a clockwise direction.

3. The invention as defined in claim 1 wherein said third fluid port means is the exit port for said fluid stream so that said apparatus functions as a pump when said shaft is rotated in a counter-clockwise direction.

4. The invention as defined in claim 1 wherein said third fluid port means is the entrance port for said fluid stream so that said apparatus functions as a turbine to rotate said discs and said shaft in a clockwise direction.

5. The invention as defined in claim 1 wherein said first fluid port means is the entrance port for said fluid stream so that said apparatus functions as a turbine to rotate said discs and said shaft in a counter-clockwise direction.

6. The invention as defined in claim 1 wherein said first and third fluid port means include a removable pitot block having said first and third fluid flow paths therethrough, said pitot block being of generally T-shape in cross-section, having a base and a single leg depending therefrom, said first and third fluid port means each extending through said base and one side of said leg, said leg extending into said peripheral zone.

7. The invention as defined in claim 6 wherein said removable block has a plurality of flow paths therethrough for each of said first and third fluid port means.

8. The invention as defined in claim 1 wherein one end of said first fluid port means is of different cross-sectional area than the other end of said fluid port means.

9. In a fluid propulsion apparatus including a generally circular hollow housing, a shaft rotatably mounted in said housing, a plurality of spaced apart circular discs mounted on the shaft for rotation therewith, interiorly of said housing, said discs being concentric relative to said housing, a circumferential peripheral zone defined as the region between the interior of the housing and the periphery of said discs, first, second and third fluid port means, each of said fluid port means extending through said housing and in communication with the interior thereof so that a fluid stream entering said first or third fluid port means flows through the housing in a spiral path and exits from the second fluid port means and so that a fluid stream entering said second fluid port means flows through said housing in a spiral path and exits from said first or said third fluid port means, the improvement comprising:

said first and third fluid port means including a removable pitot block secured to said housing and having at least two flow paths extending therethrough;

said first and third fluid port means opening in opposite directions relative to the axis of rotation of said shaft and said disc so that said shaft and disc are rotatable in both clockwise and counter-clockwise directions;

said pitot block being of generally T-shape in cross-section, having a base and a single leg depending therefrom, said first and third fluid port means each extending through said base and one side of said leg, said leg extending into said peripheral zone; the first and third fluid port means each having a first end lying in a plane substantially normal to the flow path within said peripheral zone.

10. The invention as defined in claim 9 wherein air is the fluid stream and said apparatus functions as a compressor when said shaft is mechanically rotated.

11. The invention as defined in claim 9 wherein a limited supply of air is connected to said fluid port means as said fluid stream and said apparatus functions as a vacuum pump when said shaft is mechanically rotated.

12. The invention as defined in claim 9 wherein said fluid stream is a refrigerant and said apparatus functions as a compressor when said shaft is mechanically rotated.

* * * * *